United States Patent
Oh et al.

(10) Patent No.: US 9,832,809 B2
(45) Date of Patent: *Nov. 28, 2017

(54) METHOD AND APPARATUS FOR CONTROLLING DISCONTINUOUS RECEPTION IN A WIRELESS COMMUNICATION SYSTEM

(71) Applicant: Samsung Electronics Co., Ltd., Suwon-si, Gyeonggi-do (KR)

(72) Inventors: Sang-Min Oh, Suwon-si (KR); Soeng-Hun Kim, Suwon-si (KR); Sung-Oh Kwon, Seoul (KR); Seung-Hyun Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,494

(22) Filed: Sep. 28, 2015

(65) Prior Publication Data

US 2016/0021699 A1    Jan. 21, 2016

Related U.S. Application Data

(63) Continuation of application No. 14/278,459, filed on May 15, 2014, now Pat. No. 9,198,218, which is a
(Continued)

(30) Foreign Application Priority Data

Feb. 16, 2010  (KR) .................. 10-2010-0013946
May 3, 2010    (KR) .................. 10-2010-0041609

(51) Int. Cl.
*H04W 76/04*   (2009.01)
*H04W 52/02*   (2009.01)

(52) U.S. Cl.
CPC ..... *H04W 76/048* (2013.01); *H04W 52/0216* (2013.01); *H04W 52/0229* (2013.01); *Y02B 60/50* (2013.01)

(58) Field of Classification Search
CPC . H04W 52/00; H04W 52/02; H04W 52/0203; H04W 52/0209; H04W 52/0212;
(Continued)

(56) References Cited

U.S. PATENT DOCUMENTS 8,331,238 B2    12/2012  Harada et al.
9,198,218 B2 *  11/2015  Oh .................. H04W 52/0229
(Continued)

FOREIGN PATENT DOCUMENTS

CN    101611648 A    12/2009
CN    102273250 A    12/2011
(Continued)

OTHER PUBLICATIONS

LTE; Evolved Universal Terrestrial Radio Access (E-UTRA); Medium Access Control (MAC) protocol specification (3GPP TS 36.321 version 9.0.0 Release 9), ETSI TS 136321 V9.0.0 (Oct. 2009), p. 27-29, Oct. 2009.
(Continued)

*Primary Examiner* — Chi H Pham
*Assistant Examiner* — Weibin Huang
(74) *Attorney, Agent, or Firm* — Jefferson IP Law, LLP

(57) ABSTRACT

A method and apparatus for controlling Discontinuous Reception (DRX) by a User Equipment (UE) in a wireless communication system is provided. The UE receives a DRX configuration parameter from an evolved Node B (eNB), and determines whether to start an on-duration timer based on the DRX configuration parameter, after a change in DRX cycle is completed in a subframe, thereby preventing system
(Continued)

performance degradation caused by transmission mismatch between the eNB and the UE.

8 Claims, 5 Drawing Sheets

Related U.S. Application Data continuation of application No. 13/028,577, filed on Feb. 16, 2011, now Pat. No. 8,750,186.

(58) Field of Classification Search
CPC ......... H04W 52/0216; H04W 52/0219; H04W 52/0225; H04W 52/0235; H04W 56/00; H04W 56/001; H04W 56/0015; H04B 7/2662; H04B 7/2671; H04B 7/2678; H04B 7/2681
See application file for complete search history.

(56) References Cited

U.S. PATENT DOCUMENTS

| | | | |
|---|---|---|---|
| 2008/0101268 A1 | 5/2008 | Sammour et al. | |
| 2009/0232118 A1 | 9/2009 | Wang et al. | |
| 2009/0238105 A1* | 9/2009 | Wu | H04W 52/0216 370/311 |
| 2009/0285141 A1 | 11/2009 | Cai et al. | |
| 2010/0037114 A1 | 2/2010 | Huang et al. | |
| 2010/0110897 A1* | 5/2010 | Chun | H04L 43/0811 370/241 |
| 2011/0002281 A1* | 1/2011 | Terry | H04W 76/048 370/329 |
| 2011/0237266 A1* | 9/2011 | Cai | H04W 76/048 455/450 |
| 2011/0243047 A1* | 10/2011 | Dayal | H04W 16/14 370/311 |
| 2011/0294491 A1* | 12/2011 | Fong | H04L 5/001 455/422.1 |
| 2012/0178445 A1* | 7/2012 | Dalsgaard | H04W 72/02 455/434 |
| 2013/0242953 A1* | 9/2013 | Malkamaki | H04W 76/048 370/336 |

FOREIGN PATENT DOCUMENTS

| | | |
|---|---|---|
| KR | 10-2009-0086598 A | 8/2009 |
| WO | 2008/057296 A1 | 5/2008 |
| WO | 2009/154414 A2 | 12/2009 |
| WO | 2010/053308 A2 | 5/2010 |

OTHER PUBLICATIONS

Signaling of DRX Start Offset, 3GPP TSG-RAN WG2 Meeting #63bis, R2-085387, Ericsson, Prague Czech Republic, Sep. 29-Oct. 3, 2008.
Samsung, "Correction on UE behaviour when DRX cycle changes", R2-102722, Montreal, Canada, Apr. 30, 2010.
"3rd Generation Partnership Project; Technical Specification Group Radio Access Network; Evolved Universal Terrestrial Radio Access (E-UTRA) Medium Access Control (MAC) protocol specification", XP050401617, Dec. 28, 2009.
Samsung, "Discussion on UE behaviour when DRX cycle changes", R2-101509, San Francisco, USA, Feb. 16, 2010.

* cited by examiner

METHOD AND APPARATUS FOR CONTROLLING DISCONTINUOUS RECEPTION IN A WIRELESS COMMUNICATION SYSTEM

CROSS-REFERENCE TO RELATED APPLICATION(S)

This application is a continuation application of prior application Ser. No. 14/278,459, filed on May 15, 2014, which is a continuation application of prior application Ser. No. 13/028,577, filed on Feb. 16, 2011, which has issued as U.S. Pat. No. 8,750,186, on Jun. 10, 2014, and claimed the benefit under 35 U.S.C. §119(a) of a Korean patent application filed on Feb. 16, 2010, in the Korean Intellectual Property Office and assigned Ser. No. 10-2010-0013946, and of a Korean patent application filed on May 3, 2010, in the Korean Intellectual Property Office and assigned Ser. No. 10-2010-0041609, the entire disclosure of each of which is hereby incorporated by reference.

BACKGROUND OF THE INVENTION

1. Field of the Invention

The present invention relates to a Discontinuous Reception (DRX) control method and apparatus in a wireless communication system. More particularly, the present invention relates to a DRX control method and apparatus capable of preventing system performance degradation caused by transmission mismatch between an evolved Node B (eNB), also known as a Base Station (BS), and a User Equipment (UE), also known as a Mobile Station (MS).

2. Description of the Related Art

Wireless communication systems have been developed to offer communication services to users while ensuring user mobility. Due to the rapid development of communication technologies, wireless communication systems can now provide not only voice communication services but also high-speed data communication services. Recently, standardization for a Long Term Evolution (LTE) system, one of the next-generation wireless communication systems, is underway in the 3rd Generation Partnership Project (3GPP). The LTE system, scheduled to be commercialized in 2010, implements high-speed packet-based communication at a transfer rate of a maximum of 300Mbps.

The 3GPP LTE system uses a DRX operation as one of the techniques supported to reduce power consumption of a UE. In the LTE system, the DRX operation refers to an operation in which to reduce power consumption of a UE, the UE wakes up at a predetermined cycle to receive system information or paging messages transmitted from an eNB, and stops its reception operation for the rest of the time. The DRX operation is disclosed in the 3GPP Radio Access Network 2 (RAN2) standard TS 36.321, and it is provided that a DRX cycle is changed upon expiration of a specific timer.

The DRX operation in the 3GPP LTE system is disclosed in detail in Section 5.7of TS 36.321. In 3GPP, the state of a UE may be divided into an idle state and a connected state according to the connection between the UE and its eNB. The idle state is a state where the connection is released, while the connected state is a state where the connection is established. When the DRX operation is set in a Radio Resource Control (RRC) connected (RRC CONNECTED) state, the UE discontinuously monitors a Physical Downlink Control Channel (PDCCH), a control channel transmitted from the eNB, for reduction in transmission power. The discontinuous monitoring for a control channel is carried out on a predetermined-cycle basis. This cycle is called a DRX cycle. The DRX cycle is subject to change according to the DRX operation.

FIG. 1 illustrates a DRX operation in an LTE system according to the related art.

Referring to FIG. 1, a DRX cycle 101 includes an on-duration 103 in which a UE wakes up and monitors a PDCCH, or a control channel, and a DRX opportunity duration 105 in which the UE may stop the monitoring operation. The UE periodically repeats the run/stop of the monitoring operation according to the DRX cycle 101. The DRX cycle 101 refers to a cycle during which the on-duration 103 is repeated, in which a UE wakes up and monitors a PDCCH, for example, a control channel. In the LTE system, a UE may receive a PDCCH, or a control channel transmitted by an eNB, in the on-duration 103, and the UE may operate in a sleep state where it does not monitor the PDCCH during the DRX opportunity duration 105.

However, as for the DRX operation presently disclosed in the 3GPP standard, no specific method defines how a UE should operate in a subframe where the DRX cycle changes. Due to this lack of a defined method in the LTE system, the DRX cycle applied may change according to the determination time for start/non-start of an on-duration timer 'onDurationTimer' that counts a time of the on-duration 103.

In addition, the DRX operation presently disclosed in the 3GPP TS 36.321standard is defined to determine whether to start the on-duration timer 'onDurationTimer', without taking into account the possibility that the DRX cycle may change one or more times. This may lead to inconsistency between an eNB and a UE in DRX operation and cause malfunction of the on-duration timer 'onDurationTimer' due to the change in DRX cycle, resulting in system performance degradation due to the transmission mismatch between the eNB and the UE.

SUMMARY OF THE INVENTION

An aspect of the present invention is to address at least the above-mentioned problems and/or disadvantages and to provide at least the advantages described below. Accordingly, an aspect of the present invention is to provide a DRX control method and apparatus that takes a change in DRX cycle into consideration in a wireless communication system.

Another aspect of the present invention is to provide a method and apparatus for controlling a DRX operation-related timer taking a change in DRX cycle into account in a wireless communication system.

In accordance with one aspect of the present invention, a method for controlling Discontinuous Reception (DRX) by a User Equipment (UE) in a wireless communication system is provided. The method includes receiving a DRX configuration parameter from an evolved Node B (eNB), and after a change in DRX cycle is completed in a subframe, determining whether to start an on-duration timer based on the DRX configuration parameter.

In accordance with another aspect of the present invention, a User Equipment (UE) for controlling Discontinuous Reception (DRX) in a wireless communication system is provided. The UE includes a receiver for receiving a DRX configuration parameter from an evolved Node B (eNB), and a controller for determining whether to start an on-duration timer based on the DRX configuration parameter, after a change in DRX cycle is completed in a subframe.

In accordance with another aspect of the present invention, a method of controlling DRX in a wireless communication system is provided. The method includes obtaining a DRX configuration parameter, and determining whether to start an on-duration timer based on the DRX configuration parameter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The below-described exemplary embodiments of the present invention provide various methods for controlling an operation of a Discontinuous Reception (DRX) operation-related timer taking a change in DRX cycle into account.

While exemplary embodiments of the present invention will be described in connection with, for example, the Long Term Evolution (LTE) system, exemplary embodiments of the present invention may be applied to any other wireless communication systems supporting the DRX operation. In addition, while exemplary embodiments of the present invention will be described with reference to, for example, an operation of a User Equipment (UE), the present invention may be applied to an operation of an evolved Node B (eNB).

Figure 1:
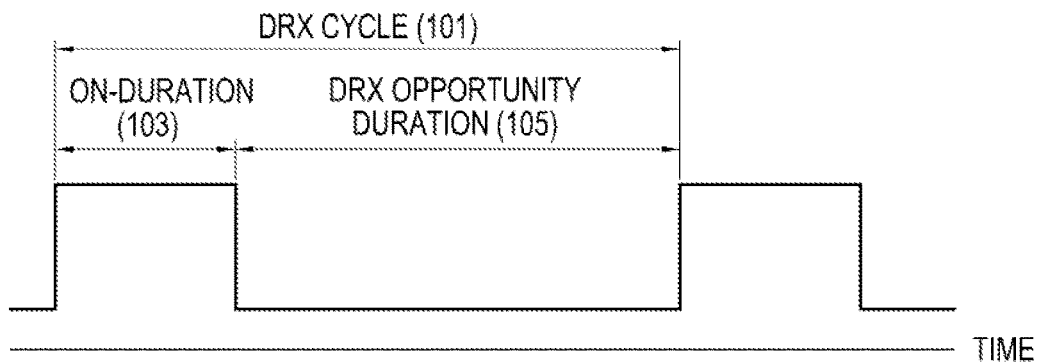
FIG. 1 is a diagram illustrating a DRX operation in an LTE system according to the related art.
Figure 2:
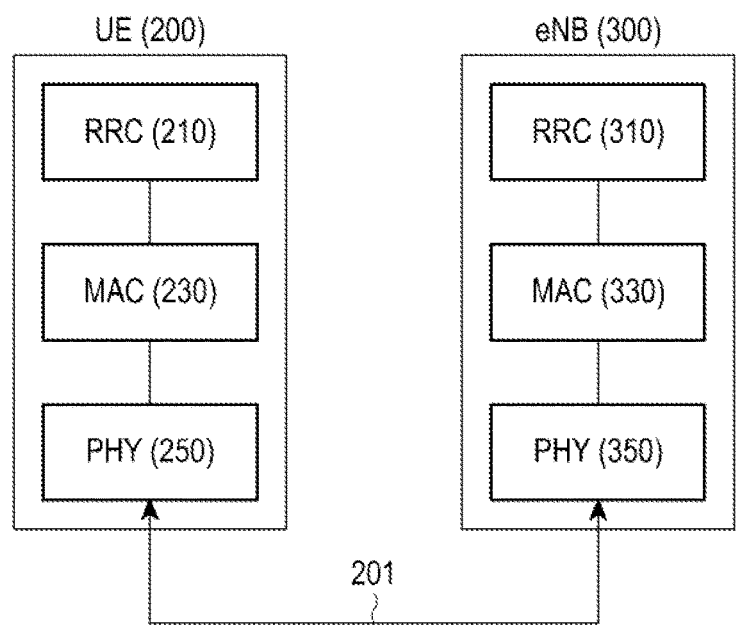
FIG. 2 is a diagram illustrating protocol stacks on control planes of a UE and an eNB performing a DRX operation according to an exemplary embodiment of the present invention.

FIG. 2 illustrates protocol stacks on control planes of a UE and an eNB performing a DRX operation according to an exemplary embodiment of the present invention.

Referring to FIG. 2, RRC layers 210 and 310, MAC layers 230 and 330, and physical (PHY) layers 250 and 350 take part in a DRX operation of the present invention in a UE 200 and an eNB 300, respectively. The DRX operation is performed in downlink (DL) transmission from the eNB 300 to the UE 200, and the below-described DRX operation in the DL transmission may be applied to uplink (UL) transmission as well.

The RRC layer 310 of the eNB 300 determines values of DRX configuration parameters to be transmitted to the UE 200, and delivers the determined parameter values to the MAC layer 330. The DRX configuration parameters may include expiration times of an on-duration timer 'onDurationTimer' and a DRX inactivity timer 'drx-InactivityTimer'. The on-duration timer 'onDurationTimer' and the DRX inactivity timer 'drx-InactivityTimer' count the times when the UE 200 may stop monitoring a control channel and enter a sleep state. The on-duration timer 'onDurationTimer' is a timer indicating the time during which the UE 200 continuously monitors a control channel in every DRX cycle. The DRX inactivity timer 'drx-InactivityTimer' is a timer indicating a predetermined time during which the UE 200 is awakened continuously after the transmission or reception when a new packet is transmitted from or received at the eNB 300.

In addition, the DRX configuration parameters may include at least one parameter indicating a long DRX cycle 'longDRX-Cycle', a DRX start offset 'drxStartOffset', an expire time of a short DRX cycle timer 'drxShortCycleTimer', and a short DRX cycle 'shortDRX-Cycle'. The UE 200 determines an application time of the on-duration timer 'onDurationTimer', defining the long DRX cycle 'longDRX-Cycle' received from the eNB 300 as a basic DRX cycle. However, if the short DRX cycle 'shortDRX-Cycle' is set as available, the UE 200 may determine an application time of the on-duration timer 'onDurationTimer' by applying the short DRX cycle 'shortDRX-Cycle' beginning from the time where the DRX inactivity timer 'drx-InactivityTimer' expires. This short DRX cycle 'shortDRX-Cycle' is applied until the short DRX cycle timer 'drxShortCycleTimer' expires. The DRX start offset 'drxStartOffset' denotes an offset for a start time of the on-duration timer 'onDurationTimer'.

The DRX cycle may be set differently according to the frequency of data transmission/reception. For example, when the UE 200 downloads a web page during web browsing, the UE 200 may use a short DRX cycle because of the frequent data transmission/reception, and may use the short DRX cycle 'shortDRX-Cycle' according to a specific rule. On the other hand, when a user reads a web page, the UE 200 may use a long DRX cycle because of the infrequent data transmission/reception, and may use the long DRX cycle 'longDRX-Cycle' according to a specific rule.

The MAC layer 330 of the eNB 300 sends the DRX configuration parameters to the PHY layer 350 using a delivery channel. The PHY layer 350 transmits the DRX configuration parameters to the PHY layer 250 of the UE 200 through a PHY channel 201. The RRC layer 210 of the UE 200 analyzes the DRX configuration parameters received from the PHY layer 250 and delivers the analyzed parameters to the MAC layer 230, so that the DRX operation according to an exemplary embodiment of the present invention, in which a change in the DRX cycle is taken into consideration, is performed in each of the UE 200 and the eNB 300. Setting of DRX-related parameters is performed in the RRC layers 210 and 310 of the UE 200 and the eNB 300. The overall operation of controlling the DRX operation using the set DRX-related parameters is performed in the MAC layers 230 and 330 of the UE 200 and the eNB 300. A DRX operation control method according to exemplary embodiments of the present invention is described in detail below.

The MAC layer 230 controls a DRX operation using the DRX configuration parameters received from the eNB 300. These parameters include at least one of the expiration times of the on-duration timer 'onDurationTimer' and the DRX inactivity timer 'drx-InactivityTimer', the long DRX cycle 'longDRX-Cycle', the DRX start offset 'drxStartOffsee', the expiration time of the short DRX cycle timer 'drxShortCycleTimer', and the short DRX cycle 'shortDRX-Cycle'. While the on-duration timer 'onDurationTimer' and the DRX inactivity timer 'drx-InactivityTimer' are running, the UE 200 monitors a PDCCH, and when set to use the DRX operation, the UE 200 performs one of the following operations in each subframe:

The UE 200 starts the on-duration timer 'onDurationTimer', if the short DRX cycle 'shortDRX-Cycle' is used and the remainder obtained by dividing [(SFN*10)+subframe number] by the short DRX cycle 'shortDRX-Cycle' is equal to the remainder obtained by dividing the DRX start offset 'drxStartOffsee by the short DRX cycle' shortDRX-Cycle.

The UE 200 starts the on-duration timer 'onDurationTimer', if the long DRX cycle 'longDRX-Cycle' is used and the remainder obtained by dividing [(SFN*10)+subframe number] by the long DRX cycle 'longDRX-Cycle' is equal to the DRX start offset 'drxStartOffset'.

The UE 200 starts the short DRX cycle timer 'drxShortCycleTimer' and sets the short DRX cycle 'shortDRX-Cycle' and uses the 'shortDRX-Cycle', if the DRX inactivity timer 'drx-InactivityTimer' expires in this subframe, or a DRX command MAC control element indicating a change in the DRX cycle is received from the eNB 300 and the short DRX cycle 'shortDRX-Cycle' is set in this subframe.

The UE 200 sets the long DRX cycle 'longDRX-Cycle' and uses the 'longDRX-Cycle', if the DRX inactivity timer 'drx-InactivityTimer' expires in this subframe, or a DRX command MAC control element indicating a change in the DRX cycle is received from the eNB 300 and the short DRX cycle 'shortDRX-Cycle' is not set in this subframe.

The UE 200 sets the long DRX cycle 'longDRX-Cycle' and uses the 'longDRX-Cycle', if the short DRX cycle timer 'drxShortCycleTimer' expires in this subframe.

In the foregoing description of the DRX operation, SFN denotes a system frame number.

In accordance with the DRX operation control method described above, the DRX cycle changes if the DRX inactivity timer 'drx-InactivityTimer' expires, a DRX command MAC control element is received, or the short DRX cycle timer 'drxShortCycleTimer' expires in this subframe.

Exemplary embodiments of the present invention propose the following DRX operation methods for the case where the DRX cycle is changed or to be changed one or more times. The following embodiments provide various types of DRX operation control methods for determining whether to start a DRX operation-related timer after checking at least one condition that a change in the DRX cycle occurs, or for checking at least one condition in which a change in DRX cycle occurs, after determining whether to start a DRX operation-related timer.

In embodiment 1, whether to start an on-duration timer 'onDurationTimer' is determined before a DRX cycle is changed in a relevant subframe.

In embodiment 2, whether to start an on-duration timer 'onDurationTimer' is determined after a DRX cycle is changed n times in a relevant subframe.

In embodiment 3, whether to start an on-duration timer 'onDurationTimer' is determined after a change in DRX cycle is fully completed in a relevant subframe.

In embodiment 4, whether to start an on-duration timer is determined before or after checking a specific condition in a relevant subframe.

In embodiment 5, a DRX inactivity timer 'drx-InactivityTimer' is considered to expire first, if both of the DRX inactivity timer 'drx-InactivityTimer' and the short DRX cycle timer 'drxShortCycleTimer' are to expire in a relevant subframe.

In embodiment 6 the current DRX cycle is maintained so as to prevent a change in DRX cycle from occurring within a short period when the short DRX cycle timer 'drxShortCycleTimer' restarts after its expiration in an impending subframe.

Embodiments 1 to 6 will be described in more detail with reference to FIGS. 3 to 8.

Embodiment 1

Figure 3:
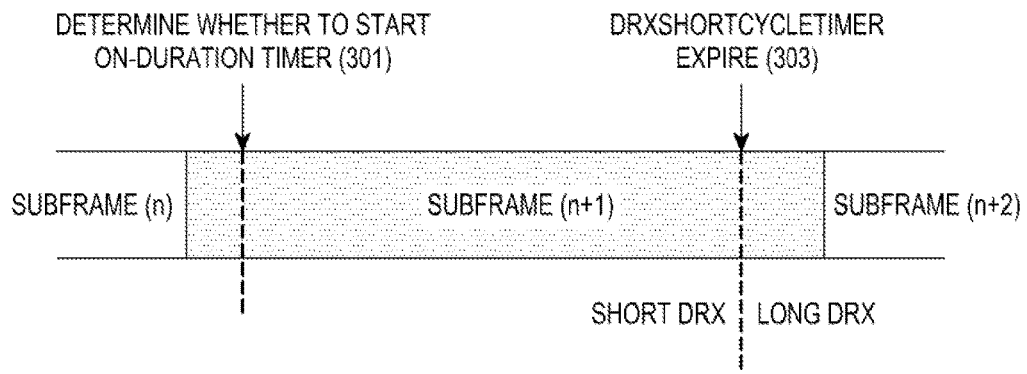
FIGS. 3 to 8 are diagrams illustrating a DRX operation control method according to exemplary embodiments of the present invention.

FIG. 3 illustrates a DRX operation control method according to an exemplary embodiment of the present invention.

Referring to FIG. 3, in each subframe the UE determines whether to start an on-duration timer 'onDurationTimer' before checking a condition where a change in DRX cycle occurs. In Embodiment 1, because the change in DRX cycle occurs (i) when the DRX inactivity timer 'drx-InactivityTimer' expires in this subframe, (ii) when the DRX command MAC control element is received from an eNB in this subframe, and (iii) when the short DRX cycle timer 'drxShortCycleTimer' expires in this subframe, the UE determines whether to start the on-duration timer 'onDurationTimer' before checking these three conditions (301). FIG. 3 illustrates a DRX operation for the case (303) in which the short DRX cycle timer 'drxShortCycleTimer' expires.

Embodiment 2

Figure 4:
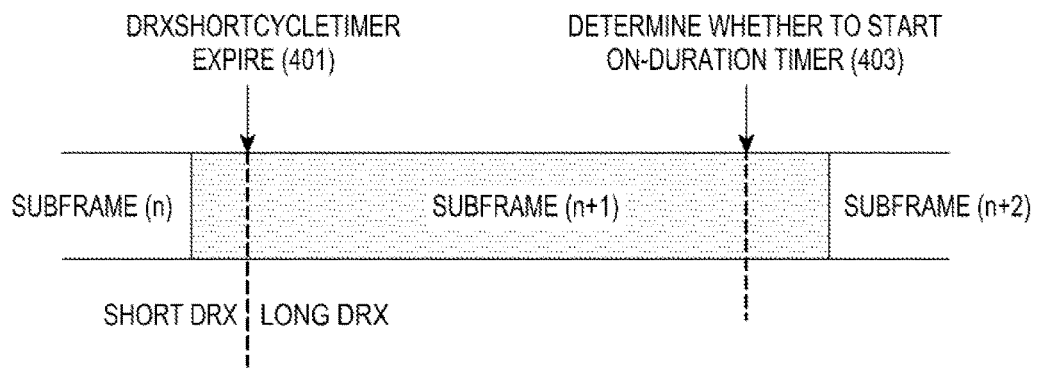

FIG. 4 illustrates a DRX operation control method according to an exemplary embodiment of the present invention.

Referring to FIG. 4, a UE determines whether to start an on-duration timer 'onDurationTimer' after a DRX cycle changes n times in a subframe. Because the change in DRX cycle occurs (i) when the DRX inactivity timer 'drx-InactivityTimer' expires in this subframe, (ii) when the DRX command MAC control element is received from an eNB in this subframe, and (iii) when the short DRX cycle timer 'drxShortCycleTimer' expires in this subframe, the UE determines whether to start the on-duration timer 'onDurationTimer' if the DRX cycle changes n times during or after the conditions are checked. FIG. 4 illustrates an example of determining whether to start the on-duration timer 'onDurationTimer' (403) after the DRX cycle is changed once due to expiration of the short DRX cycle timer 'drxShortCycleTimer' (401).

Embodiment 3

Figure 5:
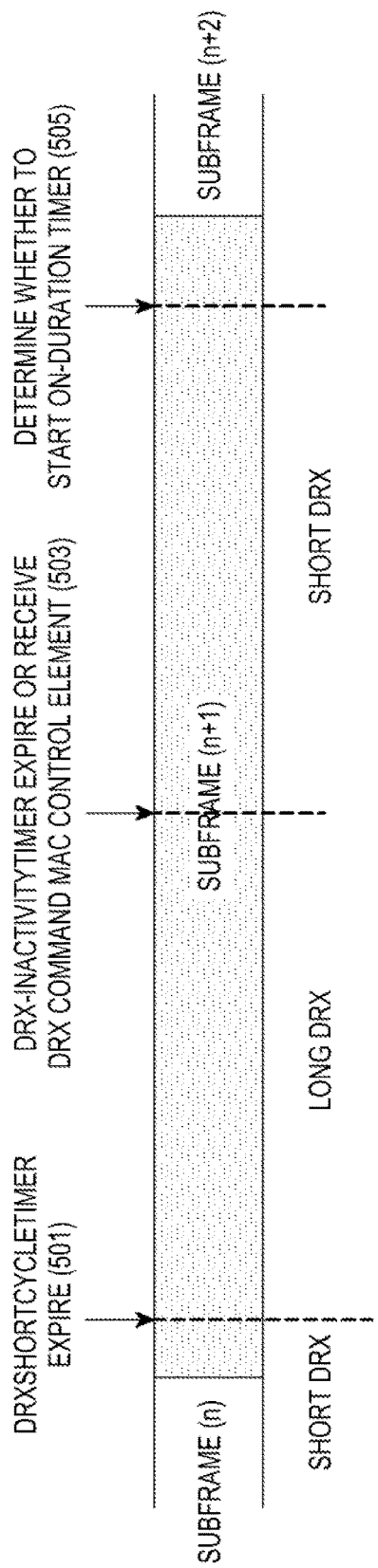

FIG. 5 illustrates a DRX operation control method according to an exemplary embodiment of the present invention.

Referring to FIG. 5, the UE determines whether to start an on-duration timer 'onDurationTimer' after a change in DRX cycle is fully completed in a subframe. Because the change in DRX cycle occurs (i) when the DRX inactivity timer 'drx-InactivityTimer' expires in this subframe, (ii) when the DRX command MAC control element is received from an eNB in this subframe, and (iii) when the short DRX cycle timer 'drxShortCycleTimer' expires in this subframe, the UE determines whether to start the on-duration timer 'onDurationTimer' after all of the conditions are checked. The exemplary embodiment of FIG. 5 represents an example where the UE determines whether to start the on-duration timer 'onDurationTimer' (505), after both of the two conditions are checked (501 and 503).

Figure 6:
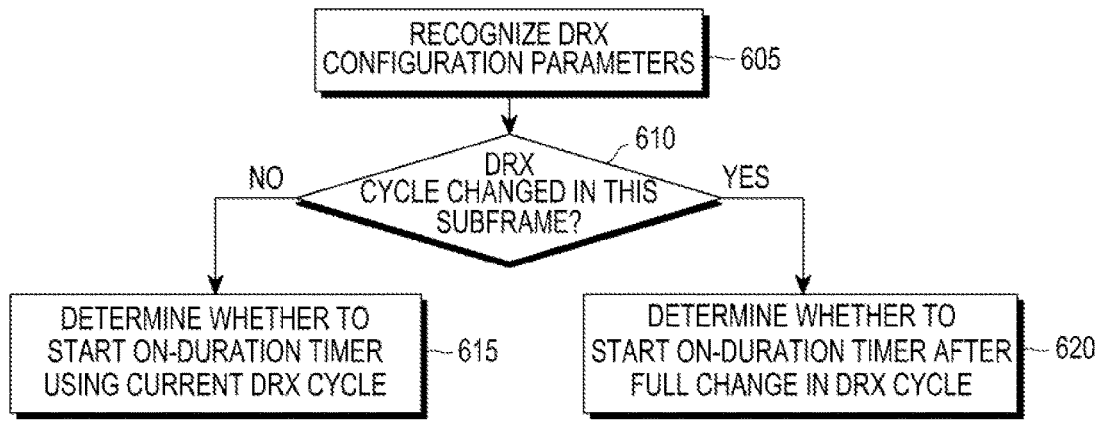

FIG. 6 illustrates a DRX operation control method according to an exemplary embodiment of the present invention.

Referring to FIG. 6, the UE recognizes DRX configuration parameters in step 605. For the parameter recognition, an eNB may notify the DRX configuration parameters to the UE in a call setup process or the like. The DRX configuration parameters may include, for example, expiration times of an on-duration timer 'onDurationTimer' and a DRX inactivity timer 'drx-InactivityTimer', a long DRX cycle 'longDRX-Cycle', a DRX start offset 'drxStartOffset', an expiration time of a short DRX cycle timer 'drxShortCycleTimer', and a short DRX cycle 'shortDRX-Cycle'.

The UE performs a DRX operation from the time that it recognizes the DRX configuration parameters. Performing a DRX operation includes determining whether to start a specific timer described in detail in Section 5.7 of TS 36.321, in each subframe, and performing a specific operation, for example, PDCCH monitoring, according to the start of the timer.

While performing the DRX operation, the UE determines a change/no-change in DRX cycle in each subframe in step 610. Just before a specific subframe starts in which a change/no-change in DRX cycle is to be determined, the UE determines whether the short DRX cycle timer 'drxShortCycleTimer' or the DRX inactivity timer 'drx-InactivityTimer' is scheduled to expire in the subframe. If the short DRX cycle timer 'drxShortCycleTimer' is scheduled to expire, the UE determines that the DRX cycle will change from the short DRX cycle 'shortDRX-Cycle' to the long DRX cycle 'longDRX-Cycle' in the subframe. If the DRX inactivity timer 'drx-InactivityTimer' is scheduled to expire in the subframe, or a DRX command MAC control element is received from an eNB and a DRX cycle at this time is the long DRX cycle 'longDRX-Cycle' in the subframe, then the UE determines that the DRX cycle will change from the long DRX cycle 'longDRX-Cycle' to the short DRX cycle 'shortDRX-Cycle' in the subframe.

If there is no change in the DRX cycle in step 610, the UE determines whether to start the on-duration timer 'onDurationTimer' in the subframe using the current DRX cycle in step 615.

If there is a change in the DRX cycle in step 610, the UE proceeds to step 620. Except for the case where a DRX command MAC control element is received, the change in DRX cycle in an arbitrary subframe indicates expiration of the DRX inactivity timer 'drx-InactivityTimer', expiration of the short DRX cycle timer 'drxShortCycleTimer', or expiration of both timers in the subframe. If only one of the two timers expires, which means that the DRX cycle changes only once, the UE determines whether to start the on-duration timer 'onDurationTimer' in the subframe using the changed DRX cycle after the change in the DRX cycle.

If the changed DRX cycle is the short DRX cycle 'shortDRX-Cycle', the UE compares the remainder obtained by dividing [(SFN*10)+subframe number] by the short DRX cycle 'shortDRX-Cycle' with the remainder obtained by dividing the DRX start offset 'drxStartOffset' by the short DRX cycle 'shortDRX-Cycle'. The UE determines whether to start the on-duration timer 'onDurationTimer' depending on whether the remainders are identical to each other.

If the changed DRX cycle is the long DRX cycle 'longDRX-Cycle', the UE compares the remainder obtained by dividing [(SFN*10)+subframe number] by the long DRX cycle 'longDRX-Cycle' with the DRX start offset 'drxStartOffset'. The UE determines whether to start the on-duration timer 'onDurationTimer' based on the comparison.

If both of the DRX inactivity timer 'drx-InactivityTimer' and the short DRX cycle timer 'drxShortCycleTimer' expire in the same subframe, the DRX cycle changes twice in the subframe. In this case, the UE determines whether to start the on-duration timer 'onDurationTimer' in the subframe using the final DRX cycle after the DRX cycle is fully changed. In step 620, the UE determines whether to start the on-duration timer 'onDurationTimer' after the DRX cycle is completely changed in an arbitrary subframe. Otherwise, in determining whether to start the on-duration timer 'onDurationTimer' in an arbitrary subframe, the UE determines whether to start the on-duration timer 'onDurationTimer' using the final DRX cycle of the subframe.

If both of the DRX inactivity timer 'drx-InactivityTimer' and the short DRX cycle timer 'drxShortCycleTimer' expire in the same subframe, the DRX cycle may either change or not change in the subframe according to which timer expires first. For example, if the short DRX cycle timer 'drxShortCycleTimer' expires before the DRX inactivity timer 'drx-InactivityTimer', the DRX cycle changes from the short DRX cycle 'shortDRX-Cycle' to the long DRX cycle 'longDRX-Cycle' and then changes back to the short DRX cycle 'shortDRX-Cycle'.

On the other hand, if the DRX inactivity timer 'drx-InactivityTimer' expires first, then the DRX cycle is maintained as the short DRX cycle 'shortDRX-Cycle' without changing, because the expiration of the DRX inactivity timer 'drx-InactivityTimer' triggers a restart of the short DRX cycle timer 'drxShortCycleTimer'.

In both of the two cases, their final DRX cycles are equal to the short DRX cycle 'shortDRX-Cycle'. Rather than changing the DRX cycle several times in one subframe, the DRX cycle should not be changed, so as to reduce a processing load of the UE. In Embodiment 5 of the present invention, if the two timers are both scheduled to expire in an arbitrary subframe, the UE is set to consider that the DRX inactivity timer 'drx-InactivityTimer' has expired first, thereby preventing unnecessary changes in the DRX cycle.

Embodiment 4

In Embodiment 4, the UE determines whether to start an on-duration timer 'onDurationTimer' before or after checking a specific cycle change condition in every subframe.

Because the change in DRX cycle occurs (i) when the DRX inactivity timer 'drx-InactivityTimer' expires in this subframe, (ii) when the DRX command MAC control element is received from an eNB in this subframe, and (iii) when the short DRX cycle timer 'drxShortCycleTimer' expires in this subframe, the UE determines whether to start the on-duration timer 'onDurationTimer' before/after checking one or more conditions.

Embodiment 5

Figure 7:
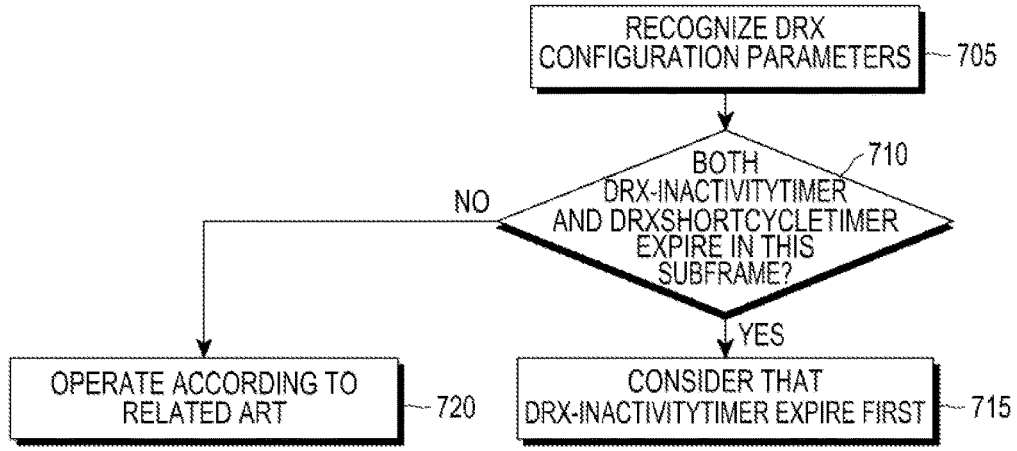

FIG. 7 illustrates a DRX operation control method according to an exemplary embodiment of the present invention.

Referring to FIG. 7, a UE recognizes DRX configuration parameters in step 705. For the parameter recognition, an eNB may notify the DRX configuration parameters to the UE in a call setup process or the like. The DRX configuration parameters may include, for example, expiration times of an on-duration timer 'onDurationTimer' and a DRX inactivity timer 'drx-InactivityTimer', a long DRX cycle 'longDRX-Cycle', a DRX start offset 'drxStartOffset', an expiration time of a short DRX cycle timer 'drxShortCycleTimer', and a short DRX cycle 'shortDRX-Cycle'.

In step 710, the UE determines whether both of the DRX inactivity timer 'drx-InactivityTimer' and the short DRX cycle timer 'drxShortCycleTimer' are scheduled to expire in an impending subframe. The impending subframe may be, for example, the next subframe.

If the two timers are not both scheduled to expire, the UE operates according to the related art in step 720. On the other hand, if the two timers are both scheduled to expire in the same subframe, the UE considers in step 715 that the DRX inactivity timer 'drx-InactivityTimer' expires first in the impending subframe, and performs a related operation. The UE first performs a specific operation associated with the expiration of the DRX inactivity timer 'drx-InactivityTimer' before performing a specific operation associated with the expiration of the short DRX cycle timer 'drxShortCycleTimer'.

The specific operation associated with the expiration of the short DRX cycle timer 'drxShortCycleTimer' may be, for example, a change from the short DRX cycle 'shortDRX-Cycle' to the long DRX cycle 'longDRX-Cycle'. The specific operation associated with the expiration of the DRX inactivity timer 'drx-InactivityTimer' may be a restart of the short DRX cycle timer 'drxShortCycleTimer'. As a result, as the short DRX cycle timer 'drxShortCycleTimer' restarts, the short DRX cycle timer 'drxShortCycleTimer' does not expire in the subframe, preventing unnecessary changes in the DRX cycle.

In a further normalization of Embodiment 5, if a plurality of timers including the DRX inactivity timer 'drx-InactivityTimer' are scheduled to expire in an arbitrary subframe, the UE may first perform a specific operation associated with the expiration of the DRX inactivity timer 'drx-InactivityTimer', considering that the DRX inactivity timer 'drx-InactivityTimer' expires first. If the DRX operation control methods according to the above exemplary embodiments are applied, a mismatch in active time due to the change in DRX cycle may be prevented for both the UE and the eNB, and the UE may prevent system performance degradation caused by the transmission mismatch with the eNB, while maintaining the power consumption reduction effects by the DRX operation.

Embodiment 6

Referring to v9.2.0 in the 3GPP standard TS 36.321, a UE starts applying a long DRX cycle in a subframe where a short DRX cycle timer 'drxShortCycleTimer' expires. However, in the case where a DRX inactivity timer 'drx-InactivityTimer' expires in the same subframe where the short DRX cycle timer 'drxShortCycleTimer' expires, depending on the implementation method, the UE may operate in such a manner that it uses the short DRX cycle 'shortDRX-Cycle' in the previous subframe, applies the long DRX cycle 'longDRX-Cycle' in the current subframe, and applies the short DRX cycle 'shortDRX-Cycle' again in the next subframe. For example, upon expiration of the above timers, the UE may, in order, check expiration of the short DRX cycle timer 'drxShortCycleTimer', determine whether to start the on-duration timer 'onDurationTimer', and check expiration of the DRX inactivity timer 'drx-InactivityTimer'. In this case, the UE may use the short DRX cycle 'shortDRX-Cycle' caused by running the short DRX cycle timer 'drxShortCycleTimer' in the previous subframe, apply the long DRX cycle 'longDRX-Cycle' caused by the expiration of the short DRX cycle timer 'drxShortCycleTimer' in the current subframe, and apply the short DRX cycle 'shortDRX-Cycle' again due to the expiration of the DRX inactivity timer 'drx-InactivityTimer' in the next subframe. However, transitioning from the short DRX cycle to the long DRX cycle and back from the long DRX cycle to the short DRX cycle within this short period increases the complexity of the UE and has no real benefit.

Embodiment 6 of the present invention provides a method for preventing a UE from changing a long DRX cycle in the above situation.

Figure 8:
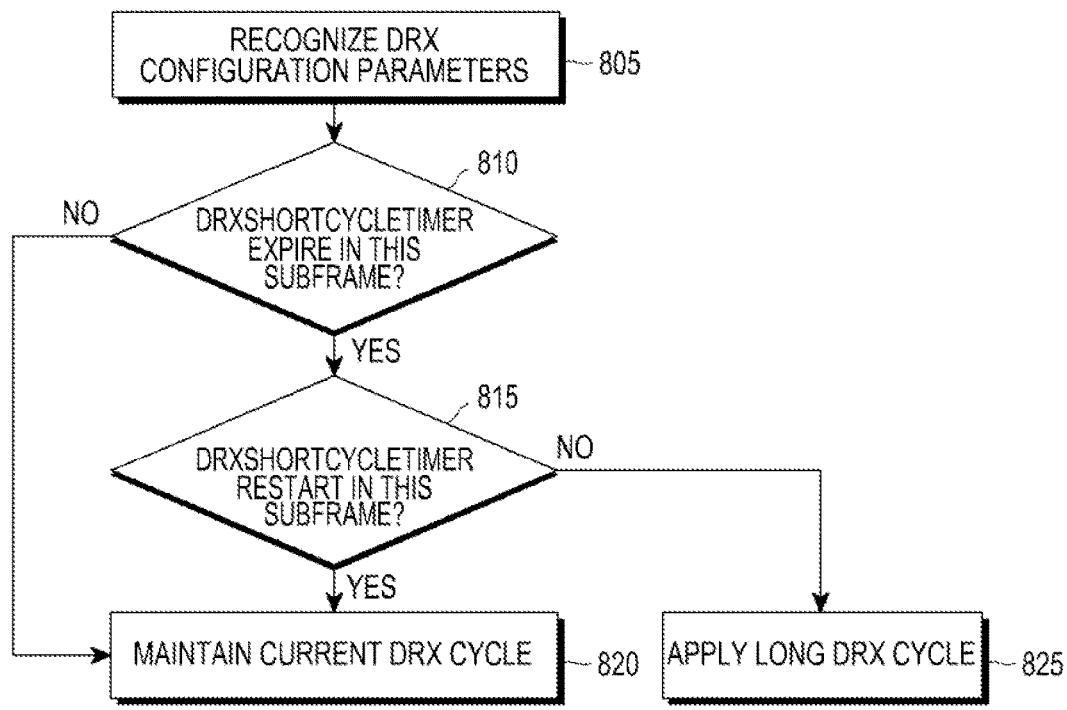

FIG. 8 illustrates a DRX operation control method according to an exemplary embodiment of the present invention.

Referring to FIG. 8, a UE recognizes DRX configuration parameters in step 805. For the parameter recognition, an eNB may notify the DRX configuration parameters to the UE in a call setup process or the like. The DRX configuration parameters may include, for example, expiration times of an on-duration timer 'onDurationTimer' and a DRX inactivity timer 'drx-InactivityTimer', a long DRX cycle 'longDRX-Cycle', a DRX start offset 'drxStartOffset', an expiration time of a short DRX cycle timer 'drxShortCycleTimer', and a short DRX cycle 'shortDRX-Cycle'.

In step 810, the UE determines whether the short DRX cycle timer 'drxShortCycleTimer' is scheduled to expire in an impending subframe. The impending subframe may be, for example, the next subframe.

If the short DRX cycle timer 'drxShortCycleTimer' is not scheduled to expire in step 810, the UE maintains the DRX cycle currently in use in step 820. If the short DRX cycle timer 'drxShortCycleTimer' is scheduled to expire in step 810, the UE determines in step 815 whether the short DRX cycle timer 'drxShortCycleTimer' restarts after its expiration in the impending subframe. Because the short DRX cycle timer's not restarting after its expiration in the impending subframe indicates that the short DRX cycle timer 'drxShortCycleTimer' is not running in the impending state, step 815 may be modified for the UE to determine whether the short DRX cycle timer 'drxShortCycleTimer' is running in the impending subframe. If the short DRX cycle timer 'drxShortCycleTimer' restarts (or the short DRX cycle timer 'drxShortCycleTimer' a running) after its expiration in the impending subframe in step 815, the UE maintains the short DRX cycle 'shortDRX-Cycle' now in use in step 820 so that the DRX cycle does not transition to the long DRX cycle 'longDRX-Cycle'. If the short DRX cycle timer 'drxShortCycleTimer' does not restart (or the short DRX cycle timer 'drxShortCycleTimer' is not in a running state) after its expiration in the impending subframe in step 815, the UE applies the long DRX cycle 'longDRX-Cycle' in step 825.

Accordingly, application of above-described Embodiment 6 may prevent unnecessary DRX transition from occurring within a short period.

Figure 9:
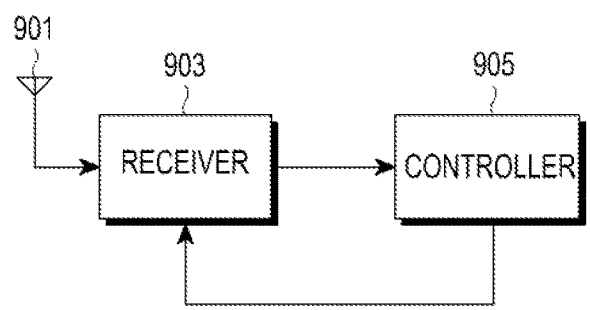
FIG. 9 is a block diagram illustrating a structure of an apparatus for controlling a DRX operation according to an exemplary embodiment of the present invention.

FIG. 9 conceptually illustrates a structure of an apparatus for controlling a DRX operation according to an exemplary embodiment of the present invention. The DRX operation control apparatus of FIG. 9 is included in a UE communicating with an eNB.

Referring to FIG. 9, a receiver 903 receives the DRX configuration parameters transmitted from an eNB (not shown), under control of a controller 905. The DRX configuration parameters received through an antenna 901 and the receiver 903 are delivered to the controller 905. The controller 905 determines whether to start a DRX operation-related timer using the DRX configuration parameters in each subframe before checking at least one condition in which a change in DRX cycle occurs. The controller 905 may make the determination according to one of the exemplary embodiments described above. For example, when a DRX operation is set in an RRC connected state, the controller 905 may control the DRX operation according to the determination results and discontinuously monitor a control channel or the like transmitted from the eNB. When using above-described Embodiment 6, the controller 905 may determine whether a short DRX cycle timer restarts in an impending subframe using the DRX configuration parameters, after the short DRX cycle timer expires in the impending subframe, and if the short DRX cycle timer restarts, the controller 905 may maintain the current DRX cycle, thereby preventing unnecessary DRX transition from occurring within a short period. The controller 905 controls the DRX operation according to exemplary embodiments of the present invention in its RRC layer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling discontinuous reception (DRX) by a user equipment (UE) in a wireless communication system, the method comprising:
  receiving, by a receiver of the UE, a DRX configuration including a first value associated with a short DRX cycle and a second value associated with a long DRX cycle from an evolved Node B (eNB);
  determining, by at least one processor, whether a DRX cycle in a subframe is changed to the short DRX cycle from the long DRX cycle or to the long DRX cycle from the short DRX cycle;
  if the DRX cycle in the subframe is changed to the short DRX cycle, determining, by the at least one processor, in the subframe, whether to start an on-duration timer based on a first remainder obtained by dividing [(system frame number (SFN) * 10) +subframe number] by the first value associated with the short DRX cycle and a second remainder obtained by dividing a DRX start offset by the first value associated with the short DRX cycle; and
  starting, by the at least one processor, the on-duration timer based on the determination of whether to start the on-duration timer based on the first remainder and the second remainder.

2. The method of claim 1, wherein the on-duration timer indicates a time for which the UE monitors a control channel in each DRX cycle.

3. The method of claim 1, wherein the DRX configuration includes at least one of an expiration time of the on-duration timer, an expiration time of a DRX inactivity timer, a DRX start offset, and an expiration time of the short DRX cycle timer.

4. The method of claim 1, further comprising, if the DRX cycle in the subframe is the long DRX cycle:
  determining, in the subframe in which the DRX cycle has been determined, whether to start an on-duration timer based on a third remainder obtained by dividing [(SFN * 10) +subframe number] by the second value associated with the long DRX cycle and a DRX start offset; and
  starting the on-duration timer based on the determination of whether to start the on-duration timer based on the third remainder.

5. A user equipment (UE) for controlling discontinuous reception (DRX) in a wireless communication system, the UE comprising:
  a receiver configured to receive a DRX configuration including a first value associated with a short DRX cycle and a second value associated with a long DRX cycle from an evolved Node B (eNB); and
  at least one processor configured to:
    determine whether a DRX cycle in a subframe is changed to the short DRX cycle from the long DRC cycle or to the long DRX cycle from the short DRX cycle,
    if the DRX cycle in the subframe is changed to the short DRX cycle, determine, in the subframe, whether to start an on-duration timer based on a first remainder obtained by dividing [(system frame number (SFN) * 10) +subframe number] by the first value associated with the short DRX cycle and a second remainder obtained by dividing a DRX start offset by the first value associated with the short DRX cycle, and
    start the on-duration timer based on the determination of whether to start the on-duration timer based on the first remainder and the second remainder.

6. The UE of claim 5, wherein the on-duration timer indicates a time for which the UE monitors a control channel in each DRX cycle.

7. The UE of claim 5, wherein the DRX configuration includes at least one of an expiration time of an on-duration timer, an expiration time of a DRX inactivity timer, a DRX start offset, and an expiration time of the short DRX cycle timer.

8. The UE of claim 5, wherein if the DRX cycle in the subframe is the long DRX cycle, the at least one processor is further configured to:
  determine, in the subframe in which the DRX cycle is determined, whether to start the on-duration timer based on a third remainder obtained by dividing [(SFN * 10) +subframe number] by the second value associated with the long DRX cycle and a DRX start offset, and
  start the on-duration timer based on the determination of whether to start the on-duration timer based on the third remainder.

* * * * *